(12) United States Patent
Warmenhoven

(10) Patent No.: US 11,943,252 B2
(45) Date of Patent: Mar. 26, 2024

(54) SECURING AGAINST NETWORK VULNERABILITIES

(71) Applicant: UAB 360 IT, Vilnius (LT)

(72) Inventor: Adrianus Warmenhoven, Overijssel (NL)

(73) Assignee: UAB 360 IT, Vilnius (LT)

( * ) Notice: Subject to any disclaimer, the term of this patent is extended or adjusted under 35 U.S.C. 154(b) by 102 days.

(21) Appl. No.: 17/687,659

(22) Filed: Mar. 6, 2022

(65) Prior Publication Data
US 2023/0283627 A1    Sep. 7, 2023

Related U.S. Application Data

(63) Continuation of application No. 17/686,390, filed on Mar. 3, 2022, now Pat. No. 11,606,383.

(51) Int. Cl.
*H04L 9/40* (2022.01)
*G06F 16/955* (2019.01)
*H04L 41/16* (2022.01)

(52) U.S. Cl.
CPC ...... *H04L 63/1433* (2013.01); *G06F 16/9566* (2019.01); *H04L 41/16* (2013.01); *H04L 63/08* (2013.01); *H04L 63/0876* (2013.01); *H04L 63/1441* (2013.01)

(58) Field of Classification Search
CPC . H04L 63/1433; H04L 63/08; H04L 63/1441; G06F 16/9566
See application file for complete search history.

(56) References Cited

U.S. PATENT DOCUMENTS

| | | |
|---|---|---|
| 8,356,333 B2 | 1/2013 | Kramer |
| 8,458,462 B1 | 6/2013 | Hanna |
| 9,106,630 B2 | 8/2015 | Frazier et al. |
| 9,306,930 B2 | 4/2016 | Keys et al. |
| 9,509,676 B1 * | 11/2016 | Johnson .............. H04W 12/065 |
| 11,463,256 B2 | 10/2022 | Clark et al. |
| 11,606,383 B1 * | 3/2023 | Warmenhoven .... H04L 63/0876 |

(Continued)

FOREIGN PATENT DOCUMENTS

WO    WO-2022124723 A1 *  6/2022

*Primary Examiner* — Sarah Su
(74) *Attorney, Agent, or Firm* — The Pattani Law Group

(57) ABSTRACT

A method comparing, by a user device, an observed characteristic with a determined characteristic, the observed characteristic indicating a current feature included in a current communication associated with a current entity with which the user device is communicating and the determined characteristic indicating an authentic feature included in an authentic communication associated with an authentic entity with which the user device intends to communicate; selectively matching, by the user device based on a result of comparing the observed characteristic with the determined characteristic, current communication information associated with the current communication with authentic communication information associated with the authentic communication; and determining, by the user device based on a result of selectively matching the current communication information with the authentic communication information, that the current entity is the authentic entity or that the current entity is not the authentic entity. Various other aspects are contemplated.

20 Claims, 7 Drawing Sheets

(56) References Cited

U.S. PATENT DOCUMENTS

| | | |
|---|---|---|
| 2009/0064299 A1 | 3/2009 | Begorre et al. |
| 2013/0198862 A1* | 8/2013 | Guo .................. H04L 51/04 726/28 |
| 2015/0113652 A1* | 4/2015 | Ben-Itzhak ........... G06F 21/566 726/23 |
| 2016/0180068 A1* | 6/2016 | Das ................... H04L 63/0861 726/7 |
| 2016/0205117 A1 | 7/2016 | Lafenfeld et al. |
| 2016/0371476 A1* | 12/2016 | Turgeman ........... G06F 3/04842 |
| 2017/0257375 A1 | 9/2017 | Dulkin et al. |
| 2018/0375888 A1 | 12/2018 | Christian |
| 2019/0238579 A1 | 8/2019 | Stählin et al. |
| 2019/0238587 A1 | 8/2019 | Stevens et al. |
| 2019/0342190 A1 | 11/2019 | Waremenhoven et al. |
| 2020/0028857 A1 | 1/2020 | Waremenhoven et al. |
| 2020/0213311 A1 | 7/2020 | Saha et al. |
| 2021/0224348 A1 | 7/2021 | Nguyen |
| 2022/0116415 A1* | 4/2022 | Burgis .................. H04L 67/51 |
| 2022/0210165 A1 | 6/2022 | Rosas Bustos et al. |
| 2022/0300924 A1* | 9/2022 | Mudumbai Srinivasa ................. G06K 7/1417 |
| 2022/0329626 A1* | 10/2022 | Sambamoorthy ... H04L 63/1483 |

\* cited by examiner

SECURING AGAINST NETWORK VULNERABILITIES

CROSS REFERENCE

This application is a continuation of U.S. Non-Provisional patent application Ser. No. 17/686,390, filed on Mar. 3, 2022, and titled "Securing Against Network Vulnerabilities," the entire contents of which are incorporated herein by reference.

FIELD OF DISCLOSURE

Aspects of the present disclosure generally relate to cyber security, and more particularly to securing against network vulnerabilities such as cybercrimes.

BACKGROUND

A user device may rely on a network to communicate information and/or to communicate messages with another user device. Such information and/or messages may include private information and/or sensitive data associated with the user device. The communication over the network may be vulnerable as being susceptible to a cybercrime, through which a malicious entity may attempt to steal, alter, disable, expose, or destroy the information through unauthorized access to the communicating user devices. A cybercrime may include, for example, a malware attack, a phishing attack, a ransomware attack, a virus attack, etc. As a result, cyber security measures may be used to prevent occurrence of the cybercrime and/or to mitigate risks associated with the cybercrime.

SUMMARY

In one aspect, the present disclosure contemplates a method including transmitting, by an infrastructure device to a user device, a determined characteristic of an authentic feature included in an authentic network communication associated with an authentic entity, with which the user device intends to communicate over a network; determining, by the user device, an observed characteristic of a current feature included in a current network communication associated with a current entity with which the user device is communicating over the network; comparing, by the user device, the observed characteristic with the determined characteristic; and determining, by the user device, that the current network communication is authentic or that the current network communication is not authentic based at least in part on a result of comparing the observed characteristic with the determined characteristic.

In another aspect, the present disclosure contemplates a system including an infrastructure device and a user device, wherein the infrastructure device is configured to transmit, to the user device, a determined characteristic of an authentic feature included in an authentic network communication associated with an authentic entity, with which the user device intends to communicate over a network, and the user device is configured to determine an observed characteristic of a current feature included in a current network communication associated with a current entity with which the user device is communicating over the network; compare the observed characteristic with the determined characteristic; and determine that the current network communication is authentic or that the current network communication is not authentic based at least in part on a result of comparing the observed characteristic with the determined characteristic.

In another aspect, the present disclosure contemplates a non-transitory computer readable medium storing instructions, which when executed by an infrastructure device, cause the infrastructure device to: transmit, to a user device, a determined characteristic of an authentic feature included in an authentic network communication associated with an authentic entity, with which the user device intends to communicate over a network, and which when executed by the user device, cause the user device to: determine an observed characteristic of a current feature included in a current network communication associated with a current entity with which the user device is communicating over the network; compare the observed characteristic with the determined characteristic; and determine that the current network communication is authentic or that the current network communication is not authentic based at least in part on a result of comparing the observed characteristic with the determined characteristic.

It is to be understood that both the foregoing general description and the following detailed description are exemplary and explanatory in nature and are intended to provide an understanding of the present disclosure without limiting the scope thereof. In that regard, additional aspects, features, and advantages of the present disclosure will be apparent to one skilled in the art from the following detailed description.

BRIEF DESCRIPTION OF THE DRAWINGS

The accompanying drawings illustrate aspects of systems, devices, methods, and/or mediums disclosed herein and together with the description, serve to explain the principles of the present disclosure. Throughout this description, like elements, in whatever aspect described, refer to common elements wherever referred to and referenced by the same reference number. The characteristics, attributes, functions, interrelations ascribed to a particular element in one location apply to those elements when referred to by the same reference number in another location unless specifically stated otherwise.

The figures referenced below are drawn for ease of explanation of the basic teachings of the present disclosure; the extensions of the figures with respect to number, position, relationship, and dimensions of the parts to form the following aspects may be explained or may be within the skill of the art after the following description has been read and understood. Further, exact dimensions and dimensional proportions to conform to specific force, weight, strength, and similar requirements will likewise be within the skill of the art after the following description has been read and understood.

The following is a brief description of each figure used to describe the present disclosure, and thus, is being presented for illustrative purposes only and should not be limitative of the scope of the present disclosure.

Figure 1:
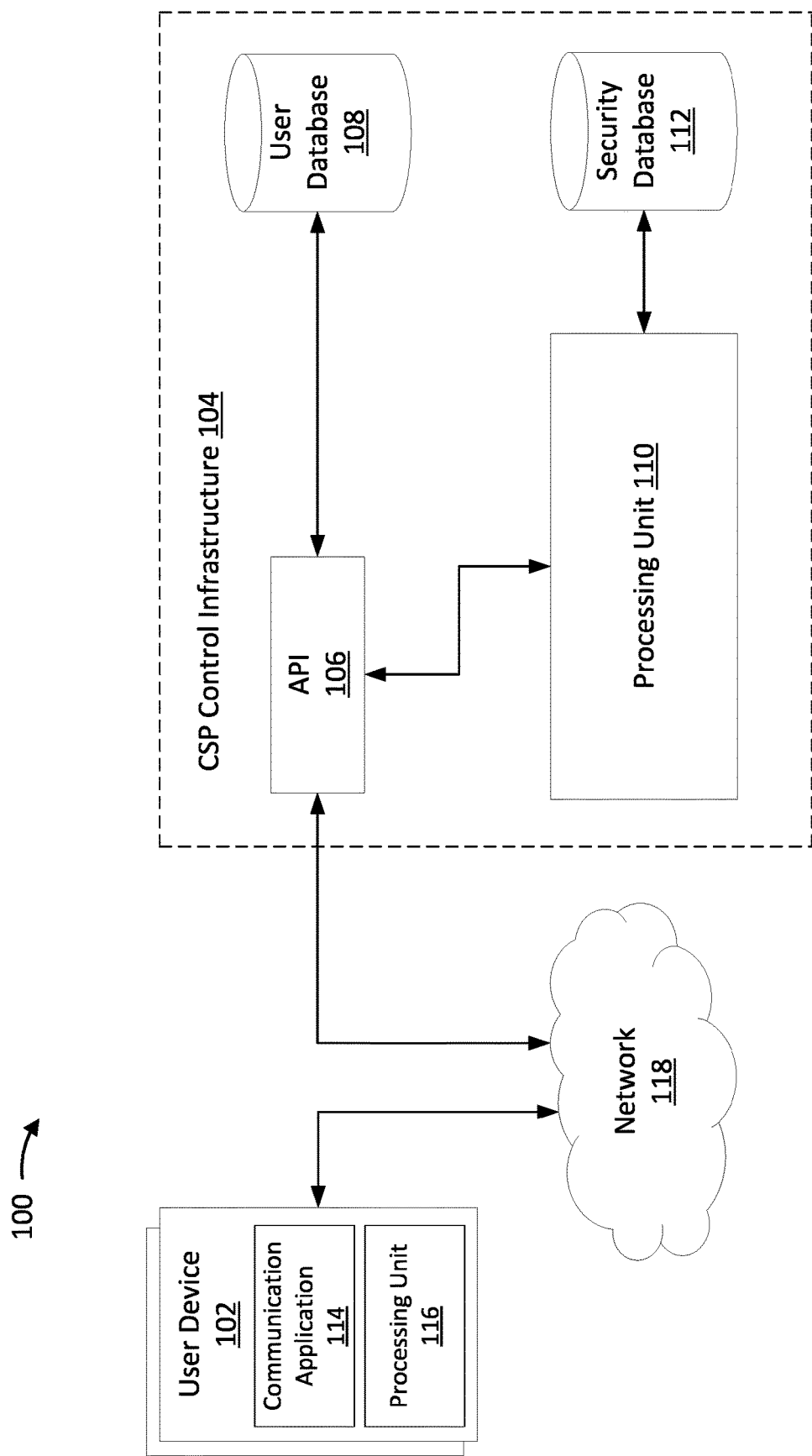

FIG. 1 is an illustration of an example system associated with securing against network vulnerabilities, according to various aspects of the present disclosure.

Figure 2:
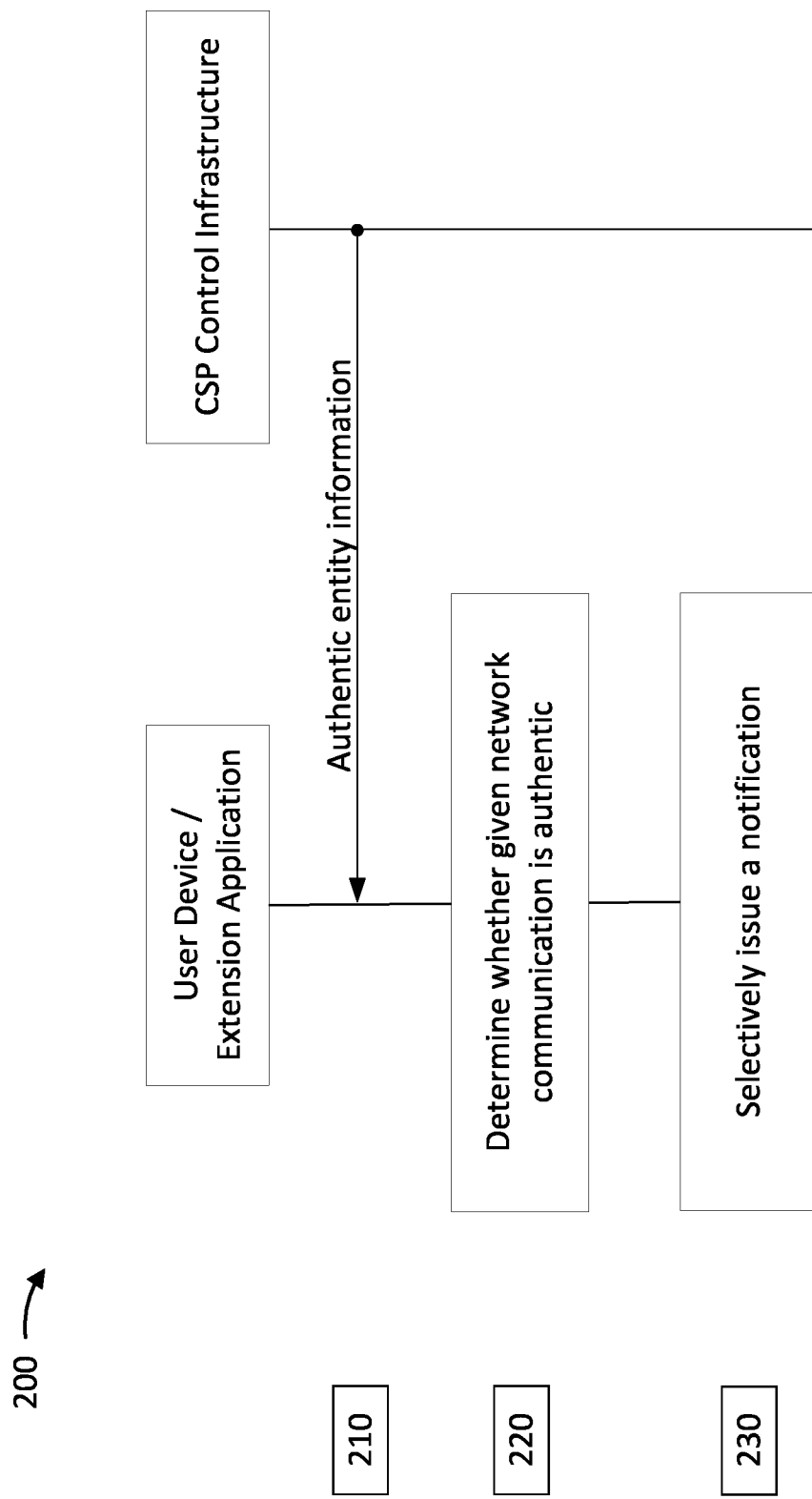

FIG. 2 is an illustration of an example flow associated with securing against network vulnerabilities, according to various aspects of the present disclosure.

Figure 3:
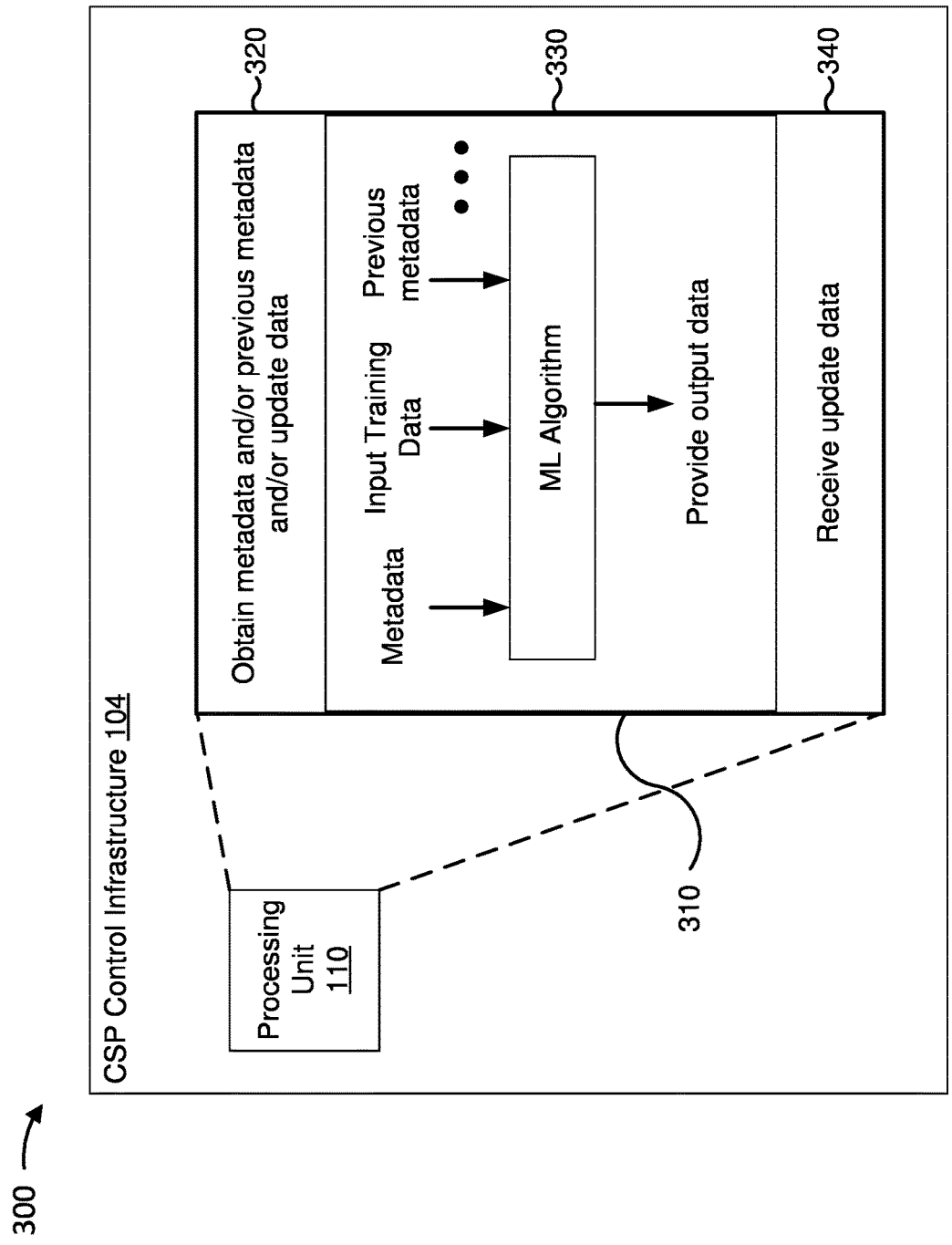

FIG. 3 is an illustration of an example associated with securing against network vulnerabilities, according to various aspects of the present disclosure.

Figure 4:
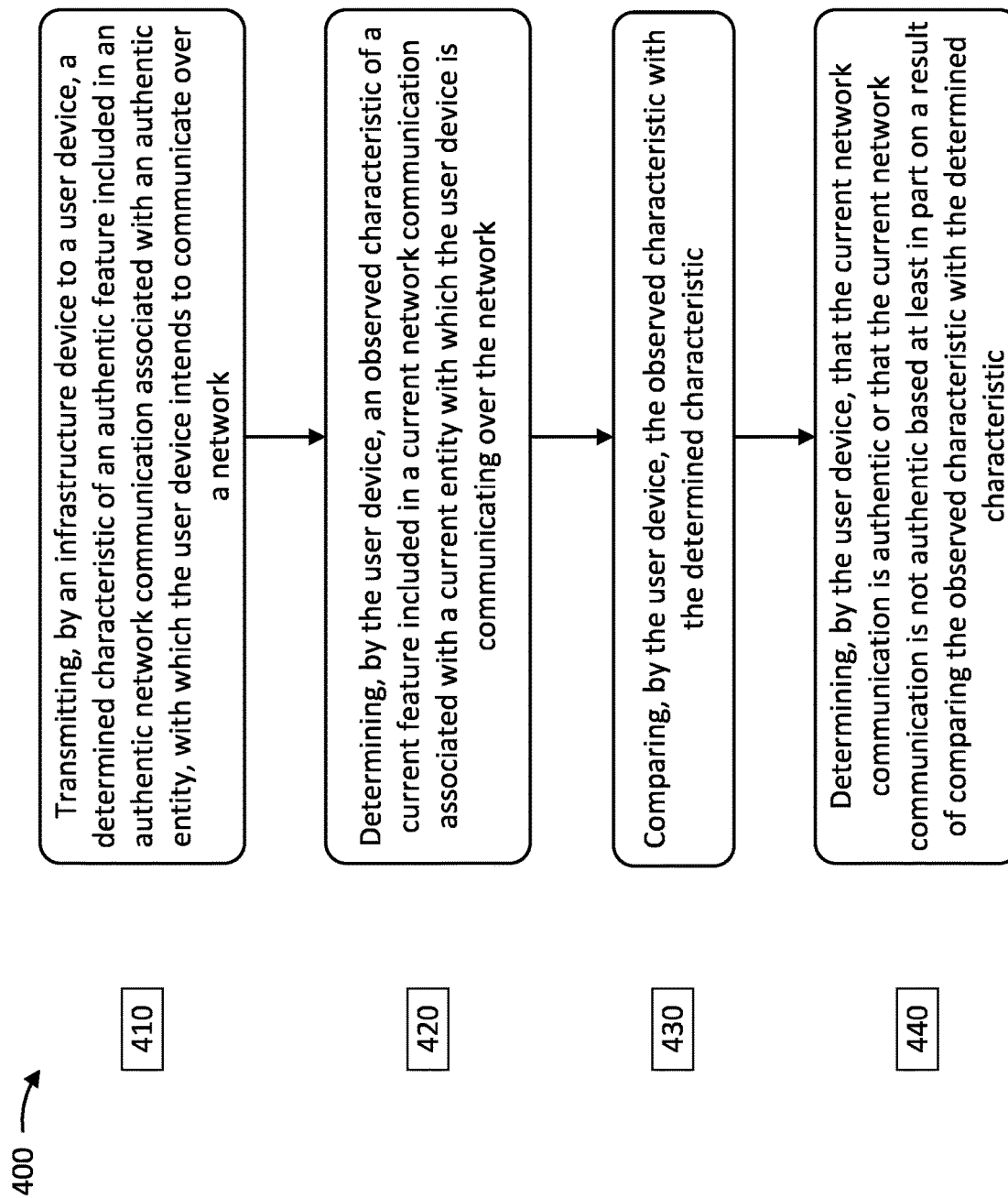

FIG. 4 is an illustration of an example process associated with securing against network vulnerabilities, according to various aspects of the present disclosure.

Figure 5:
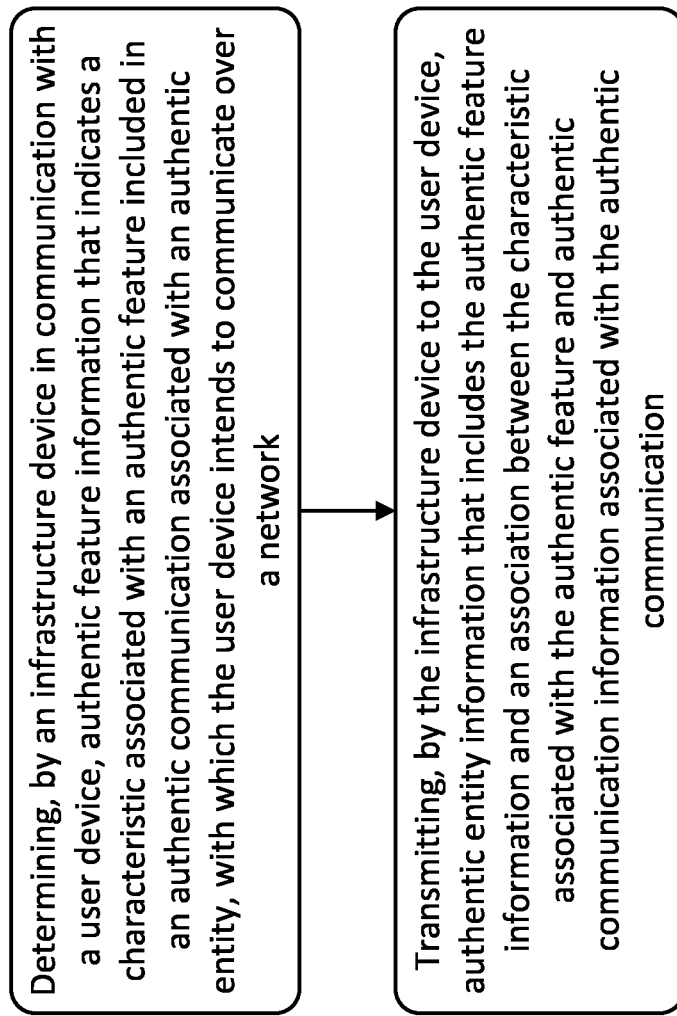

FIG. 5 is an illustration of an example process associated with securing against network vulnerabilities, according to various aspects of the present disclosure.

Figure 6:
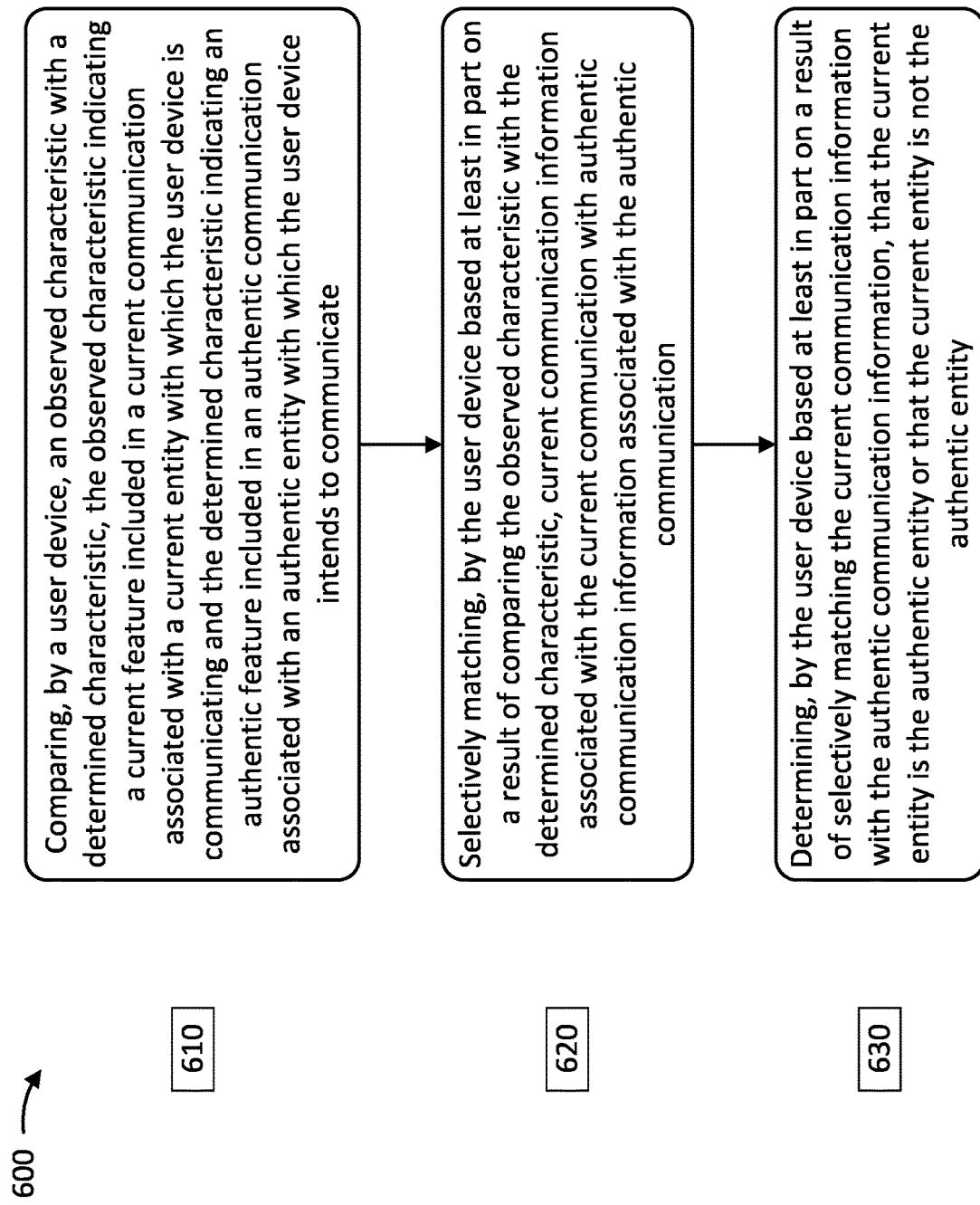

FIG. 6 is an illustration of an example process associated with securing against network vulnerabilities, according to various aspects of the present disclosure.

Figure 7:
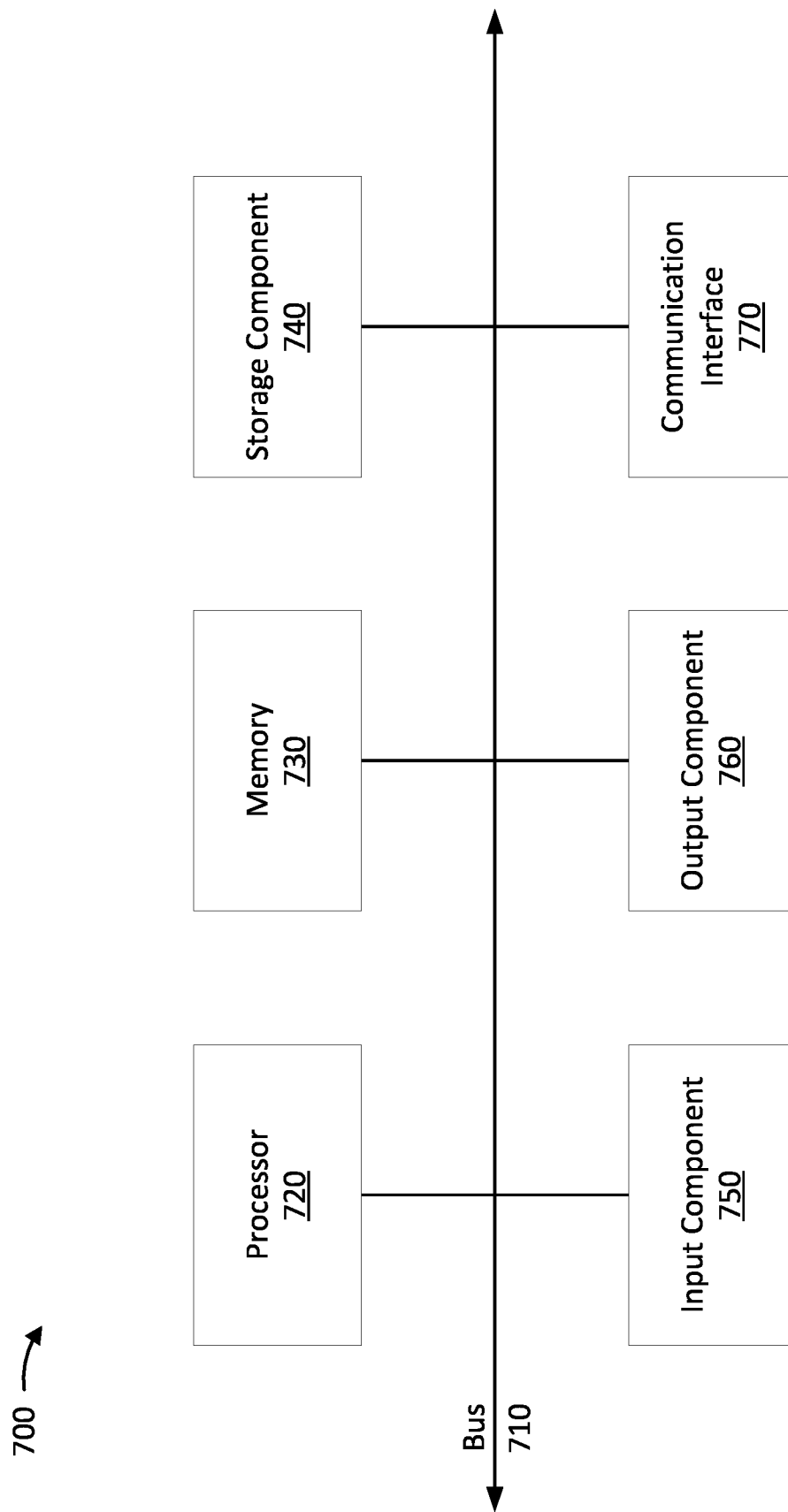

FIG. 7 is an illustration of example devices associated with securing against network vulnerabilities, according to various aspects of the present disclosure.

DETAILED DESCRIPTION

For the purposes of promoting an understanding of the principles of the present disclosure, reference will now be made to the aspects illustrated in the drawings, and specific language may be used to describe the same. It will nevertheless be understood that no limitation of the scope of the disclosure is intended. Any alterations and further modifications to the described devices, instruments, methods, and any further application of the principles of the present disclosure are fully contemplated as would normally occur to one skilled in the art to which the disclosure relates. In particular, it is fully contemplated that the features, components, and/or steps described with respect to one aspect may be combined with the features, components, and/or steps described with respect to other aspects of the present disclosure. For the sake of brevity, however, the numerous iterations of these combinations may not be described separately. For simplicity, in some instances the same reference numbers are used throughout the drawings to refer to the same or like parts.

FIG. 1 is an illustration of an example 100 associated with securing against network vulnerabilities, according to various aspects of the present disclosure. Example 100 shows an architectural depiction of included components. In some aspects, the components may include one or more user devices 102 capable of communicating with a cyber security service provider (CSP) control infrastructure 104 for purposes of obtaining cyber security services. In some aspects, the one or more user devices 102 may communicate with the CSP control infrastructure 104 over a network 118. The CSP control infrastructure 104 may be owned and operated by a cyber security service provider and may include an application programming interface (API) 106, a user database 108, processing unit 110, and a security database 112. In some aspects, a user device 102 may include a communication application 114 and a processing unit 116. The communication application may include an application utilized by the user device 102 to communicate information and/or messages over the network 118. The communication application may include third-party applications such as, for example, a web browser application, an email application, a social network application, a messaging application, or the like. The API 106 may be capable of communicating with the user database 108 and with the processing unit 110. Additionally, the processing unit 110 may be capable of communicating with the security database 112, which may be capable of storing data associated with providing cyber security services.

The user device 102 may be a physical computing device capable of hosting the communication application 114 and of connecting to the network 118. The user device 102 may be, for example, a laptop, a mobile phone, a tablet computer, a desktop computer, a smart device, a router, or the like. In some aspects, the user device 102 may include, for example, Internet-of-Things (IoT) devices such as MSP smart home appliances, smart home security systems, autonomous vehicles, smart health monitors, smart factory equipment, wireless inventory trackers, biometric cyber security scanners, or the like. The network 118 may be any digital telecommunication network that permits several nodes to share and access resources. In some aspects, the network 118 may include one or more of, for example, a local-area network (LAN), a wide-area network (WAN), a campus-area network (CAN), a metropolitan-area network (MAN), a home-area network (HAN), Internet, Intranet, Extranet, and Internetwork.

The CSP control infrastructure 104 may include a combination of hardware and software components that enable provision of cyber security services to the user device 102. The CSP control infrastructure 104 may interface with (the communication application on) the user device 102 via the API 106, which may include one or more endpoints to a defined request-response message system. In some aspects, the API 106 may be configured to receive, via the network 118, a connection request from the user device 102 to establish a connection with the CSP control infrastructure 104 for purposes of obtaining the cyber security services. The connection request may include an authentication request to authenticate the user device 102. The API 106 may receive the authentication request and a request for the cyber security services in a single connection request. In some aspects, the API 106 may receive the authentication request and the request for the cyber security services in separate connection requests.

The API 106 may further be configured to handle the connection request(s) by mediating the authentication request. For instance, the API 106 may receive from the user device 102 credentials including, for example, a unique combination of a user ID and password for purposes of authenticating the user device 102. In another example, the credentials may include a unique validation code known to an authentic user. The API 106 may provide the received credentials to the user database 108 for verification.

The user database 108 may include a structured repository of valid credentials belonging to authentic users. In one example, the structured repository may include one or more tables containing valid unique combinations of user IDs and passwords belonging to authentic users. In another example, the structured repository may include one or more tables containing valid unique validation codes associated with authentic users. The cyber security service provider may add or delete such valid unique combinations of user IDs and passwords from the structured repository at any time. Based at least in part on receiving the credentials from the API 106, the user database 108 and a processor (e.g., the processing unit 110 or another local or remote processor) may verify the received credentials by matching the received credentials with the valid credentials stored in the structured repository. In some aspects, the user database 108 and the processor may authenticate the user device 102 when the received credentials match at least one of the valid credentials. In this case, the cyber security service provider may provide the security services to the user device 102. When the received credentials fail to match at least one of the valid credentials, the user database 108 and the processor may fail to authenticate the user device 102. In this case, the cyber security service provider may decline to provide cyber security services to the user device 102.

When the user device 102 is authenticated, the user device 102 may initiate a connection with the CSP control infrastructure 104 for obtaining the cyber security services. The processing unit 110 included in the CSP control infrastructure 104 may be configured to determine the cyber security services to be provided to the user device 102. In some aspects, the processing unit 110 may be a logical unit including a logical component configured to perform complex operations associated with computing, for example, numerical weights related to various factors associated with providing the cyber security services. The processing unit 110 may utilize the API 106 to transmit information associated with the cyber security services to the user device 102.

One or more components (e.g., API 106, user database 108, processing unit 110, and/or security database 112, communication application 114, processing unit 116) included in the CSP control infrastructure 104 and/or included in the user device 102, as shown in FIG. 1, may further be associated with a controller/processor, a memory, a communication interface, or a combination thereof (e.g., FIG. 7). For instance, the one or more components may include or may be included in a controller/processor, a memory, or a combination thereof. In some aspects, the one or more components included in the CSP control infrastructure 104 may be separate and distinct from each other. Alternatively, in some aspects, the one or more of the components included in the CSP control infrastructure 104 may be combined with one or more of the other components. In some aspects, the one or more of the components included in the CSP control infrastructure 104 and/or the user device 102 may be local with respect to each other. Alternatively, in some aspects, one or more of the components included in the CSP control infrastructure 104 and/or the user device 102 may be located remotely with respect to one or more of other components included in the CSP control infrastructure 104 and/or the user device 102. Additionally, or alternatively, one or more components of the components included in the CSP control infrastructure 104 and/or the user device 102 may be implemented at least in part as software stored in a memory for execution by a processor. For example, a component (or a portion of a component) may be implemented as instructions or code stored in a non-transitory computer-readable medium and executable by a controller or a processor to perform the functions or operations of the component. Additionally, the one or more components may be configured to perform one or more functions described as being performed by another set of components shown in FIG. 1.

As indicated above, FIG. 1 is provided as an example. Other examples may differ from what is described with regard to FIG. 1.

A user device may rely on a network (e.g., Internet) to communicate (e.g., transmit and/or receive) information and/or messages with other devices connected to the network. Such information and/or messages may include private information and/or sensitive data associated with the user device. Such private information and/or sensitive data may include, for example, financial information, medical information, business information, etc. In an example, the user device may communicate financial information by utilizing a web browser to conduct transactions with a device associated with a financial institution (e.g., a bank). In another example, the user device may communicate private information of a personal nature associated with, for example, a user of the user device by utilizing a messaging application and/or a social network application. In yet another example, the user device may communicate confidential information by utilizing an email application to conduct business with a device associated with a client or a business entity.

The communication of the information and/or messages over the network may be susceptible to a cybercrime perpetrated by a malicious party who may attempt to steal, alter, disable, expose, or destroy the information through unauthorized access to the communicating devices. A cybercrime may include, for example, a malware attack, a phishing attack, a ransomware attack, a virus attack, etc. The malware attack may be associated with use of malicious software (e.g., malware) designed to steal information and/or to damage the user device. The phishing attack may be associated with a malicious party communicating fraudulent messages (e.g., email) while masquerading as a reputable entity or an authorized entity, with the intent of stealing private information and/or sensitive data. The ransomware attack may include use of malware designed to render a system and/or information (e.g., a file, a document, etc.) on the user device unusable. The virus attack may include use of harmful software with an objective of affecting the user device (and other associated devices) with the intent of stealing data, interrupting operation, etc.

Because of increased prevalence in utilization of the network to communicate information and/or messages, it may be prudent to implement protective measures to secure the communicating devices and/or the communicated information/messages against cybercrimes. In some cases, the protective measures may include manual intervention. For instance, to avoid falling prey to a cybercrime, a user of the user device may manually inspect features associated with a network communication (e.g., a webpage, an email, a message, etc.) to ensure that the network communication is authentic. In an example, the user may manually inspect features such as images, text, layout, content, etc. included in the network communication to determine whether the network communication is associated with an authorized and/or authentic (e.g., non-malicious) entity. Specifically, the user may manually inspect whether an image and/or text displayed in association with the network communication is authentic, whether a layout of the image and/or text displayed in association with the network communication is authentic, whether content displayed in association with the network communication is authentic, etc.

Such manual inspection may be unreliable and error-prone. This is because manual inspection may be influenced by many factors such as age, state of mind, physical health, attitude, emotions, propensity for certain common mistakes, errors and cognitive biases, etc. Further, manual inspection may need to be performed at every instance of communication (e.g., for every webpage, every email, every message, etc.) over the network. Due to one or more of these factors, the user may fail to identify that the features of the network communication are not authentic and/or that the network communication is associated with an unauthorized and/or malicious party. As a result, the user may communicate the information and/or messages including the private information and/or sensitive data via the network communication. In this case, the private information and/or sensitive data may become compromised such that the unauthorized and/or malicious party may use the private information and/or sensitive data for nefarious purposes and/or to affect operation of the user device and/or to damage/destroy the user device. In an example, the operating system may run slower and/or associated circuitry may emit excessive heat and/or noise, thereby causing damage to the user device. The user device may expend various user device resources (e.g., processing resources, memory resources, power consumption resources, battery life, or the like) in efforts to mitigate effects of the damage.

Various aspects of systems and techniques discussed in the present disclosure enable securing against network vulnerabilities. In some aspects, a CSP control infrastructure may provide a user device with an extension application to be associated with a communication application utilized by the user device to communicate information and/or messages over a network. The extension application may communicate with the CSP control infrastructure to receive authentic entity information including authentic feature information associated with authentic features (e.g., graphics, text, layout, content, etc.) included in authentic network communications (e.g., a webpage, an email, a message, etc.) associated with one or more authentic entities. The extension application may also receive updated authentic entity information from the CSP control infrastructure. Further, the extension application may receive the updated authentic entity information periodically. In some aspects, authentic entities may include an entity that is authorized to communicate with the user device and/or with whom the user device intends to communicate over the network. The received authentic entity information may also include a table of the authentic feature information (associated with a given authentic entity) being correlated with authentic network communication information (associated with the given authentic entity) (e.g., uniform resource locator (URL) link, domain information, etc.). When the user device utilizes current network communication information to communicate (e.g., transmit and/or receive) with a given entity over the network, the extension application may, in real time, analyze the authentic entity information and determine a portion of network communication information, from among the authentic network communication information included in the table, the portion of network communication information being associated with the given entity. Further, the extension application may utilize an associated processor (e.g., processor 116, processor 720) to compare, in real time, the current network communication information with the portion of network communication information. Based at least in part on a result of the comparison, the extension application may determine whether the current network communication information is authentic. In an example, when the current network communication information matches network communication information included in the portion of network communication information, the extension application may determine that the current network communication is authentic. Alternatively, when the current network communication information fails to match network communication information included in the portion of network communication information, the extension application may determine that the current network communication is not authentic (e.g., malicious). In this case, the extension application may cause the user device to issue a visual and/or audible notification indicating that the current network communication is not authentic. Based at least in part on the notification, the user device may suspend utilizing the current network communication to communicate with the given entity. In this way, private information and/or sensitive data associated with the user device may be prevented from becoming compromised. Further, the user device may be enabled to expend user device resources (e.g., processing resources, memory resources, power consumption resources, battery life, or the like) for suitable tasks.

FIG. 2 is an illustration of an example flow 200 associated with securing against network vulnerabilities, according to various aspects of the present disclosure. The example flow 200 may include a user device in communication with a CSP control infrastructure 104. The user device may be similar to a user device 102 discussed above with respect to FIG. 1. In some aspects, the user device may be associated with an account registered with the CSP control infrastructure 104. The user device may install an extension application associated with (e.g., provided by) the CSP control infrastructure 104. The user device may utilize the extension application to communicate with an application programming interface (API) and/or a processor (e.g., processing unit 110, processor 620) associated with the CSP control infrastructure 104. In some aspects, the user device and the CSP control infrastructure 104 may communicate with each other over a network (e.g., network 118). As discussed elsewhere herein, the CSP control infrastructure 104 may enable the user device to obtain cyber security services.

In some aspects, the user device may install communication applications to be utilized to communicate information and/or messages with other devices over the network. The communication applications may include third party applications such as, for example, email clients (e.g., Outlook application, Gmail application, etc.), web browsers (e.g., Firefox, Chrome, Internet Explorer, etc.), messaging clients (e.g., Slack, Facebook messenger, etc.), social media applications (e.g., Facebook, Instagram, etc.), or the like.

In some aspects, the user device may install the extension application, associated with (e.g., provided by) the CSP control infrastructure 104, as an extension to a communication application utilized by the user device to communicate information and/or messages with other devices over the network. Based at least in part on the extension application being installed as an extension to the communication application, the extension application may enable the user device to receive information to be processed by the communication application and/or by the CSP control infrastructure 104. The extension application may include respective graphical user interfaces to receive the information via local input interfaces (e.g., touch screen, keyboard, mouse, pointer, etc.) associated with the user devices. The information may be received via text input or via a selection from among a plurality of options (e.g., pull down menu, etc.). Further, the extension application may enable transmission of at least a portion of the information to the CSP control infrastructure 104. In some aspects, the extension application may activate and/or enable, at appropriate times, the graphical interface for receiving the information. For instance, the extension application may cause a screen (e.g., local screen) associated with the user device to display, for example, a pop-up message to request entry of the information. In some cases, as shown by reference numeral 230, the extension application may cause the screen associated with the user device to display, for example, a visual pop-up message to issue a notification. Further, the extension application may cause audio devices (e.g., speakers, headphones, etc.) associated with the user device to produce an audible message to issue the notification. In some aspects, the notification may include audible and/or visual messages. In some aspects, the extension application may utilize a processing unit (e.g., processing unit 116, processor 720) associated with the user device to perform such processes/operations associated with obtaining the cyber security services.

Although only one user device is shown in FIG. 2, the present disclosure contemplates the system to include any number of user devices that perform the processes discussed herein in a similar and/or analogous manner.

In some aspects, the user device may receive cyber security services from the CSP control infrastructure 104. When the user device is authenticated, the user device may initiate a connection with the CSP control infrastructure 104 to obtain the cyber security services. While obtaining the cyber security services, as shown by reference numeral 210, the CSP control infrastructure 104 may transmit, and the user device may receive, authentic entity information. In some aspects, the authentic entity information may include authentic feature information and an authentic entity table.

In some aspects, the authentic feature information may indicate a known characteristic of a known authentic feature included in a known authentic network communication associated with a known authentic entity, with which the user device intends to communicate over a network. In some aspects, the authentic feature information may be associated with authentic features such as, for example, graphics (e.g., illustrations, diagrams, photos, logos, etc.), text, layout, content, etc. included in authentic network communications such as, for example, websites, emails, messages, etc. associated with one or more known authentic entities. The CSP control infrastructure 104 may determine, for each authentic entity, such authentic feature information based at least in part on analyzing the authentic network communications and correlating the authentic features with the authentic network communication information (e.g., URLs, domain names, etc.) associated with the authentic network communications.

In an example, the CSP control infrastructure 104 may systematically analyze one or more authentic websites known to be associated with an authentic entity to determine characteristics regarding the authentic features included in the one or more authentic websites. For instance, the CSP control infrastructure 104 may determine the characteristics regarding appearance of one or more graphics on an authentic webpage associated with an authentic web site. Such characteristics may include a size associated with the one or more graphics, a color associated with the one or more graphics, a position associated with the one or more graphics, etc., or a combination thereof, on the authentic webpage. Also, the CSP control infrastructure 104 may determine characteristics regarding text appearing on the authentic webpage. Such characteristics may include a font size associated with the text, a font color associated with the text, a positioning of the text, etc., or a combination thereof, on the authentic webpage. Further, the CSP control infrastructure 104 may determine characteristics regarding a layout of information on the authentic webpage. Such characteristics may include a relationship between a position of the one or more graphics with a position of the text on the authentic webpage. Furthermore, the CSP control infrastructure 104 may determine characteristics regarding content included in the authentic webpage. Such characteristics may include a set of keywords associated with the content included in the authentic webpage.

In some aspects, the authentic websites may be associated with all websites published on the World Wide Web, especially those authentic websites that may be more susceptible to cybercrimes. In an example, the CSP control infrastructure 104 may specifically analyze authentic websites associated with elevated security concerns such as websites associated with, for example, financial institutions, business entities, medical institutions, educational institutions, etc. In another example, the CSP control infrastructure 104 may analyze authentic websites that observe a threshold amount of data traffic such as websites associated with, for example, research websites (e.g., Google), social media websites (e.g., Facebook), etc.

Similarly, the CSP control infrastructure 104 may determine characteristics regarding appearance of one or more graphics on one or more authentic emails and/or messages (e.g., email/messages) associated with (e.g., received from) the authentic entity. Such characteristics may include a size associated with the one or more graphics, a color associated with the one or more graphics, a position associated with the one or more graphics, etc., or a combination thereof, on an authentic email/message. Also, the CSP control infrastructure 104 may determine characteristics regarding text appearing on the authentic email/message. Such characteristics may include a font size associated with the text, a font color associated with the text, a positioning of the text, etc., or a combination thereof, on the authentic email/message. Further, the CSP control infrastructure 104 may determine characteristics regarding a layout of information on the authentic email/message. Such characteristics may include a relationship between a position of the one or more graphics with a position of the text on the authentic email/message. Furthermore, the CSP control infrastructure 104 may determine characteristics regarding content included in the authentic email/message. Such characteristics may include a set of keywords associated with, for example, a domain name (e.g., @entity.com, etc.) associated with the authentic entity.

In some aspects, the authentic email/messages may be associated with all active domain names, especially those active domain names that may be more susceptible to cybercrimes. The CSP control infrastructure 104 may specifically analyze authentic email/messages associated with elevated security concerns such as email/messages associated with, for example, financial institutions, business entities, medical institutions, educational institutions, etc. The CSP control infrastructure 104 may analyze authentic email/messages that observe a threshold amount of data traffic such as email/messages associated with, for example, popular websites (e.g., Gmail, Yahoo, etc.), social media websites, etc.

In some aspects, as shown in example 300 of FIG. 3, the processing unit 110 included in the CSP control infrastructure 104 may include and/or utilize a self-learning machine learning model (ML model) 310 in connection with analyzing the authentic network communications (e.g., a website, an email, a message, etc.) and correlating the authentic features with the authentic network communication information (e.g., a URL, a domain name, etc.). In some aspects, the ML model 310 may include a supervised learning model. In some aspects, the ML model 310 may include an unsupervised learning model. The processing unit 110 may utilize the ML model 310 to automatically and with improved accuracy analyze the authentic network communications and correlate the authentic features with the authentic network communication information.

As shown by reference numeral 320, the ML model 310 may obtain training data including metadata and/or previous metadata associated with information received during at least one previous instance of analyzing the authentic network communications and correlating the authentic features with the authentic network communication information and/or update data associated with an output provided by the ML model 310 during at least one previous instance of analyzing the authentic network communications and correlating the authentic features with the authentic network communication information. In some aspects, the processing unit 110 may store the above training data in, and the ML model 310 may obtain the above training data from, for example, one or more memories described elsewhere herein (e.g., security database 112, memory 730). In some aspects, the previous metadata may include historical metadata associated with the at least one previous instance of analyzing the authentic network communications and correlating the authentic features with the authentic network communication information. In some aspects, the update data may include historical output data associated with at least one previous instance of analyzing the authentic network communications and correlating the authentic features with the authentic network communication information. In some aspects, the ML model 310 may obtain input training data that is input via an interface associated with the CSP control infrastructure 104.

As shown by reference number 330, the ML model 310 may process the training data using a machine learning algorithm (ML algorithm). In some aspects, the ML model 310 may utilize the ML algorithm to evaluate the training data to learn trends and patterns associated with analyzing the authentic network communications and correlating the authentic features with the authentic network communication information. In some aspects, the ML algorithm may evaluate and take into account feedback information (e.g., success rate) associated with previously analyzing authentic network communications and correlating authentic features with the authentic network communication information. The ML algorithm may provide output data to the processing unit 110 based at least in part on the evaluated training data and the learned trends and patterns. In some aspects, the output data may indicate a value associated with the likelihood that the authentic network communications were analyzed successfully and/or that the authentic features were successfully correlated with the authentic network communication information, thereby assisting the processing unit 110 in more accurately automating the analyzing of the authentic network communications and correlating of the authentic features with the authentic network communication information.

As shown by reference number 340, at an end of an instance of automating the analyzing of the authentic network communications and correlating of the authentic features with the authentic network communication information, the ML model 310 may receive update data including at least the training data and/or the output data. In some aspects, the update data may be included in the previous metadata stored in the one or more memories (e.g., security database 112, memory 730) to be used as training data for future iterations of automating analyzing of the authentic network communications and correlating of the authentic features with the authentic network communication information. In some aspects, the ML model 310 may evaluate the update data to learn various aspects such as accuracy, consistency, reliability, efficiency, and/or the like of the output data in enabling the processing unit 110 to more accurately analyze the authentic network communications and/or to correlate of the authentic features with the authentic network communication information. In this way, the processing unit 110 may utilize the ML model 310 to apply a rigorous and automated process to analyze the authentic network communications and/or to correlate the authentic features with the authentic network communication information. In some aspects, the ML model 310 may enable the processing unit 110 to more accurately analyze the authentic network communications and/or to correlate the authentic features with the authentic network communication information.

In some aspects, the CSP control infrastructure 104 may also determine, for one or more authentic entities, an authentic entity table of authentic feature information (associated with a given authentic entity) correlated with authentic network communication information (associated with the given authentic entity). In an example, the CSP control infrastructure 104 may determine correlations of, for example, authentic graphics, text, layout, content, etc. associated with the given authentic entity with, for example, authentic website URLs, domain names, etc. associated with the given authentic entity. Further, the CSP control infrastructure 104 may store the correlations in the authentic entity table.

As shown by reference numeral 220, based at least in part on receiving the authentic entity information, including the authentic feature information and the authentic entity table, the extension application may utilize a local and/or remote processor (e.g., processor 116, processor 720) associated with the user device to secure the user device (and other associated devices) against network vulnerabilities. In an example, the extension application may utilize the local and/or remote processor to determine whether a given (e.g., currently used) network communication is authentic. In some aspects, the extension application may store the received authentic entity information in a local and/or remote memory (e.g., memory 730) associated with the user device.

When the user device utilizes the communication application to communicate with an entity over the network, the user device may utilize current network communication information (e.g., URL link, domain information, etc.) associated with a current network communication (e.g., website, email, message, etc.). The user device may not know whether the entity is the authentic entity, whether the current network communication information is authentic, and/or whether the current network communication is authentic. In this case, the extension application may monitor current features (e.g., graphics, text, layout, content, etc.) included in and/or associated with the current network communication. Further, the extension application may determine, for each current network communication, current feature information based at least in part on analyzing the current features observed with respect to the current network communication. In some aspects, the current feature information may indicate an observed characteristic of a current feature included in the current network communication associated with the current entity with which the user device is communicating or with which the user device is to communicate over the network. In some aspects, a user of the user device may observe such current features associated with the current network communication on a screen (e.g., output component 760) associated with the user device.

In an example, when the user device utilizes a web browser application to communicate via a current website, the extension application may systematically analyze a current webpage associated with the current website to determine current feature information regarding the current features observed with respect to a current webpage. For instance, the extension application may determine current feature information regarding appearance of one or more graphics on the current webpage. Such information may include a size associated with the one or more graphics, a color associated with the one or more graphics, a position associated with the one or more graphics, etc., or a combination thereof, on the current webpage. Also, the extension application may determine current feature information regarding text appearing on the current webpage. Such information may include a font size associated with the text, a font color associated with the text, a positioning of the text, etc., or a combination thereof, on the current webpage. Further, the extension application may determine current feature information regarding a layout of information on the current webpage. Such information may include a relationship between a position of the one or more graphics with a position of the text on the current webpage. Furthermore, the extension application may determine current feature information regarding content included in the current webpage. Such information may include a set of keywords associated with the content included in the current webpage.

Similarly, when the user device utilizes an email application and/or a messaging application, the extension application may determine current feature information regarding appearance of one or more graphics observed with respect to a current email/message. Such information may include a size associated with the one or more graphics, a color associated with the one or more graphics, a position associated with the one or more graphics, etc., or a combination thereof, on the current email/message. Also, the extension application may determine current feature information regarding text appearing on the current email/message. Such information may include a font size associated with the text, a font color associated with the text, a positioning of the text, etc., or a combination thereof, on the current email/message. Further, the extension application may determine current feature information regarding a layout of information in the current email/message. Such information may include a relationship between a position of the one or more graphics with a position of the text in the current email. Furthermore, the extension application may determine current feature information regarding content included in the current email/message. Such information may include a set of keywords associated with, for example, a domain name (e.g., @entity.com, etc.).

Based at least in part on determining the current feature information, the extension application may compare the determined current feature information with the authentic feature information stored in the memory (e.g., memory 730) associated with the user device. In some aspects, the extension application may compare the current feature information with the authentic feature information to determine whether the current network communication (e.g., a website, an email, a message, etc.) is authentic. For instance, when the current feature information fails to match at least a portion of the authentic feature information (e.g., is substantially different with respect to the authentic feature information), the extension application may determine that the current features (e.g., graphics, text, layout, content, etc.) are not authentic. Further, based at least in part on the current feature information failing to match at least a portion of the authentic feature information, the extension application may determine that the current features are not associated with an authentic entity. In this case, the extension application may determine that the current network communication being utilized by the user device to communicate is not authentic. As a result, the extension application may cause the processor associated with the user device to suspend utilization of the current network communication and/or to provide a visual and/or audible notification indicating that the current network communication is not authentic. Such a notification may indicate that the user device is susceptible to a cyber-crime based at least in part on utilizing the current network communication. In some aspects, suspending utilization of the current network communication may include suspending communication of information in association with the current network communication.

Alternatively, when the current feature information matches (e.g., is substantially similar to) at least a portion of the authentic feature information, the extension application may determine that the current features (e.g., graphics, text, layout, content, etc.) is authentic and associated with the authentic entity with which the portion of the authentic feature information is correlated in the authentic entity table. Also, based at least in part on the current featured information matching at least a portion of the authentic feature information, the extension application may determine that the current feature information is authentic. Further, the extension application may compare the current network communication information (e.g., URL link, domain information, etc.) with the authentic network communication information associated with the authentic entity included in the authentic entity table. When the current network communication information matches at least a portion of the authentic network communication information, the extension application may determine that the current network communication information is authentic. In some aspects, when the current network communication information entirely matches the authentic network communication information, the extension application may determine that the current network communication information is authentic. Based at least in part on the current network communication information matching at least a portion of the authentic network communication information or based at least in part on the current network communication information entirely matching the authentic network communication information, the extension application may determine that the current network communication information is associated with the authentic entity with which the portion of the authentic feature information is correlated in the authentic entity table. In this case, the extension application may determine that the current network communication being utilized by the user device to communicate is authentic. As a result, the extension application may enable the processor associated with the user device to continue utilization of the current network communication.

In this way, private information and/or sensitive data associated with the user device may be prevented from becoming compromised. Further, by conducting the more process-intensive task of training the machine learning model at the CSP control infrastructure to more accurately analyze the authentic network communications and/or to correlate the authentic features with the authentic network communication information and by transmitting the authentic entity information to the user device, the user device may be enabled to conserve user device resources and efficiently utilize such user device resources (e.g., processing resources, memory resources, power consumption resources, battery life, or the like) to perform less process-intensive tasks associated with securing the user device against network vulnerabilities.

As indicated above, FIGS. 2 and 3 are provided as examples. Other examples may differ from what is described with regard to FIGS. 2 and 3.

FIG. 4 is an illustration of an example process 400 associated with securing against network vulnerabilities, according to various aspects of the present disclosure. In some aspects, the process 400 may be performed by a memory and/or a processor/controller (e.g., processing unit 116, processor 720) associated with a user device/endpoint (e.g., user device 102) running an extension application and/or by a memory and/or a processor (e.g., processing unit 110, processor 720) associated with an infrastructure device associated with a control infrastructure (e.g., CSP control infrastructure 104). As shown by reference numeral 410, process 400 may include transmitting, by an infrastructure device to a user device, a determined characteristic of an authentic feature included in an authentic network communication associated with an authentic entity, with which the user device intends to communicate over a network. For instance, the infrastructure device may utilize an associated communication interface (e.g., communication interface 770) along with the associated memory and/or processor to transmit, to a user device, a determined characteristic of an authentic feature included in an authentic network communication associated with an authentic entity, with which the user device intends to communicate over a network, as discussed elsewhere herein.

As shown by reference numeral 420, process 400 may include determining, by the user device, an observed characteristic of a current feature included in a current network communication associated with a current entity with which the user device is communicating over the network. For instance, the user device may utilize the associated memory and/or processor to determine an observed characteristic of a current feature included in a current network communication associated with a current entity with which the user device is communicating over the network, as discussed elsewhere herein.

As shown by reference numeral 430, process 400 may include comparing, by the user device, the observed characteristic with the determined characteristic. For instance, the user device may utilize the associated memory and/or processor to compare the observed characteristic with the determined characteristic, as discussed elsewhere herein.

As shown by reference numeral 440, process 400 may include determining, by the user device, that the current network communication is authentic or that the current network communication is not authentic based at least in part on a result of comparing the observed characteristic with the determined characteristic. For instance, the user device may utilize the associated memory and/or processor to determine that the current network communication is authentic or that the current network communication is not authentic based at least in part on a result of comparing the observed characteristic with the determined characteristic, as discussed elsewhere herein.

Process 400 may include additional aspects, such as any single aspect or any combination of aspects described below and/or in connection with one or more other processes described elsewhere herein.

In a first aspect, process 400 may include determining, by the infrastructure device, the determined characteristic based at least in part on analyzing the authentic network communication, wherein determining the observed characteristic includes determining, by the user device, the observed characteristic based at least in part on analyzing the current network communication.

In a second aspect, alone or in combination with the first aspect, process 400 may include determining, by the infrastructure device, the determined characteristic based at least in part on utilizing a machine learning model.

In a third aspect, alone or in combination with the first through second aspects, process 400 may include providing, by the user device, a visual or audible notification indicating that the current network communication is not authentic based at least in part on the result of the comparing indicating that the observed characteristic fails to match the determined characteristic.

In a fourth aspect, alone or in combination with the first through third aspects, process 400 may include suspending, by the user device, the communicating with the current entity based at least in part on the result of the comparing indicating that the observed characteristic fails to match the determined characteristic.

In a fifth aspect, alone or in combination with the first through fourth aspects, in process 400, determining that the current network communication is authentic includes determining that the current network communication is authentic based at least in part on the result of the comparing indicating that the observed characteristic matches the determined characteristic.

In a sixth aspect, alone or in combination with the first through fifth aspects, in process 400, determining that the current network communication is not authentic includes determining that the current network communication is not authentic based at least in part on the result of the comparing indicating that the observed characteristic fails to match the determined characteristic.

Although FIG. 4 shows example blocks of the process, in some aspects, the process may include additional blocks, fewer blocks, different blocks, or differently arranged blocks than those depicted in FIG. 4. Additionally, or alternatively, two or more of the blocks of the process may be performed in parallel.

As indicated above, FIG. 4 is provided as an example. Other examples may differ from what is described with regard to FIG. 4.

FIG. 5 is an illustration of an example process 500 associated with securing against network vulnerabilities, according to various aspects of the present disclosure. In some aspects, the process 500 may be performed by a memory and/or a processor/controller (e.g., processing unit 110, processor 720) associated with an infrastructure device (e.g., CSP control infrastructure 104). As shown by reference numeral 510, process 500 may include determining, by an infrastructure device in communication with a user device, authentic feature information that indicates a characteristic associated with an authentic feature included in an authentic communication associated with an authentic entity, with which the user device intends to communicate over a network. For instance, the infrastructure device may utilize the associated memory and/or processor to determine, while in communication with a user device, authentic feature information that indicates a characteristic associated with an authentic feature included in an authentic communication associated with an authentic entity, with which the user device intends to communicate over a network, as discussed elsewhere herein.

As shown by reference numeral 520, process 500 may include transmitting, by the infrastructure device to the user device, authentic entity information that includes the authentic feature information and an association between the characteristic associated with the authentic feature and authentic communication information associated with the authentic communication. For instance, the infrastructure device may utilize an associated communication interface (e.g., communication interface 770) along with the associated memory and/or processor to transmit, to the user device, authentic entity information that includes the authentic feature information and an association between the characteristic associated with the authentic feature and authentic communication information associated with the authentic communication, as discussed elsewhere herein.

Process 500 may include additional aspects, such as any single aspect or any combination of aspects described below and/or in connection with one or more other processes described elsewhere herein.

In a first aspect, in process 500, the authentic feature includes a graphic or text, the authentic communication includes a webpage or an email associated with the authentic entity, and the authentic communication information includes a uniform resource locator (URL) or a domain name associated with the authentic entity.

In a second aspect, alone or in combination with the first aspect, in process 500, the characteristic is associated with an appearance of the authentic feature in the authentic communication.

In a third aspect, alone or in combination with the first through second aspects, in process 500, the characteristic is associated with a relationship between a position of a graphic and a position of text in the authentic communication.

In a fourth aspect, alone or in combination with the first through third aspects, in process 500, determining the authentic feature information includes determining the authentic information periodically; and transmitting the authentic entity information includes transmitting the authentic entity information periodically.

In a fifth aspect, alone or in combination with the first through fourth aspects, in process 500, determining the authentic feature information includes determining the authentic feature information based at least in part on utilizing a machine learning algorithm.

In a sixth aspect, alone or in combination with the first through fifth aspects, process 500 may include determining, by the infrastructure device, an association between the characteristic associated with the authentic feature and the authentic communication information.

Although FIG. 5 shows example blocks of the process, in some aspects, the process may include additional blocks, fewer blocks, different blocks, or differently arranged blocks than those depicted in FIG. 5. Additionally, or alternatively, two or more of the blocks of the process may be performed in parallel.

As indicated above, FIG. 5 is provided as an example. Other examples may differ from what is described with regard to FIG. 5.

FIG. 6 is an illustration of an example process 600 associated with securing against network vulnerabilities, according to various aspects of the present disclosure. In some aspects, the process 600 may be performed by a memory and/or a processor/controller (e.g., processing unit 116, processor 720) associated with a user device/endpoint (e.g., user device 102) executing an extension application. As shown by reference numeral 610, process 600 may include comparing, by a user device, an observed characteristic with a determined characteristic, the observed characteristic indicating a current feature included in a current communication associated with a current entity with which the user device is communicating and the determined characteristic indicating an authentic feature included in an authentic communication associated with an authentic entity with which the user device intends to communicate. For instance, the user device may utilize the associated memory and/or processor to compare an observed characteristic with a determined characteristic, the observed characteristic indicating a current feature included in a current communication associated with a current entity with which the user device is communicating and the determined characteristic indicating an authentic feature included in an authentic communication associated with an authentic entity with which the user device intends to communicate, as discussed elsewhere herein.

As shown by reference numeral 620, process 600 may include selectively matching, by the user device based at least in part on a result of comparing the observed characteristic with the determined characteristic, current communication information associated with the current communication with authentic communication information associated with the authentic communication. For instance, the user device may utilize the associated memory and/or processor to selectively match, based at least in part on a result of comparing the observed characteristic with the determined characteristic, current communication information associated with the current communication with authentic communication information associated with the authentic communication, as discussed elsewhere herein.

As shown by reference numeral 630, process 600 may include determining, by the user device based at least in part on a result of selectively matching the current communication information with the authentic communication information, that the current entity is the authentic entity or that the current entity is not the authentic entity. For instance, the user device may utilize the associated memory and/or processor to determine, based at least in part on a result of selectively matching the current communication information with the authentic communication information, that the current entity is the authentic entity or that the current entity is not the authentic entity, as discussed elsewhere herein.

Process 600 may include additional aspects, such as any single aspect or any combination of aspects described below and/or in connection with one or more other processes described elsewhere herein.

In a first aspect, in process 600, comparing the observed characteristic with the determined characteristic includes comparing an appearance of the current feature in the current communication with an appearance of the authentic feature in the authentic communication.

In a second aspect, alone or in combination with the first aspect, in process 600, selectively matching the current communication information with the authentic communication information includes selectively matching the current communication information with the authentic communication information when the result of comparing the observed characteristic with the determined characteristic indicates that the observed characteristic is substantially the same as the determined characteristic.

In a third aspect, alone or in combination with the first through second aspects, in process 600, determining that the current entity is the authentic entity includes determining that the current entity is the authentic entity when the result of selectively matching the current communication information with the authentic communication information indicates that the current communication information is the same as the authentic communication information.

In a fourth aspect, alone or in combination with the first through third aspects, in process 600, determining that the current entity is not the authentic entity includes determining that the current entity is not the authentic entity when the result of selectively matching the current communication information with the authentic communication information indicates that the current communication information is not the same as the authentic communication information.

In a fifth aspect, alone or in combination with the first through fourth aspects, in process 600, the current feature includes a graphic or text and the authentic feature includes a graphic or text, the current communication includes a webpage or an email associated with the current entity and the authentic communication includes a webpage or an email associated with the authentic entity, and the current communication information includes a uniform resource locator (URL) or a domain name associated with the current entity and the authentic communication information includes a URL or a domain name associated with the authentic entity.

In a sixth aspect, alone or in combination with the first through fifth aspects, process 600 may include determining, by the user device, current feature information associated with the observed characteristic; and receiving, by the user device, authentic feature information associated with the determined characteristic.

Although FIG. 6 shows example blocks of the process, in some aspects, the process may include additional blocks, fewer blocks, different blocks, or differently arranged blocks than those depicted in FIG. 6. Additionally, or alternatively, two or more of the blocks of the process may be performed in parallel.

As indicated above, FIG. 6 is provided as an example. Other examples may differ from what is described with regard to FIG. 6.

FIG. 7 is an illustration of example devices 700 associated with securing against network vulnerabilities, according to various aspects of the present disclosure. In some aspects, the example devices 700 may form part of or implement the systems, servers, environments, infrastructures, components, devices, or the like described elsewhere herein (e.g., CSP control infrastructure) and may be used to perform example processes described elsewhere herein. The example devices 700 may include a universal bus 710 communicatively coupling a processor 720, a memory 730, a storage component 740, an input component 750, an output component 760, and a communication interface 770.

Bus 710 may include a component that permits communication among multiple components of a device 700. Processor 720 may be implemented in hardware, firmware, and/or a combination of hardware and software. Processor 720 may take the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some aspects, processor 720 may include one or more processors capable of being programmed to perform a function. Memory 730 may include a random access memory (RAM), a read only memory (ROM), and/or another type of dynamic or static storage device (e.g., a flash memory, a magnetic memory, and/or an optical memory) that stores information and/or instructions for use by processor 720.

Storage component 740 may store information and/or software related to the operation and use of a device 700. For example, storage component 740 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 750 may include a component that permits a device 700 to receive information, such as via user input (e.g., a touch screen display, a keyboard, a keypad, a mouse, a button, a switch, and/or a microphone). Additionally, or alternatively, input component 750 may include a component for determining location (e.g., a global positioning system (GPS) component) and/or a sensor (e.g., an accelerometer, a gyroscope, an actuator, another type of positional or environmental sensor, and/or the like). Output component 760 may include a component that provides output information from device 700 (via, for example, a display, a speaker, a haptic feedback component, an audio or visual indicator, and/or the like).

Communication interface 770 may include a transceiver-like component (e.g., a transceiver, a separate receiver, a separate transmitter, and/or the like) that enables a device 700 to communicate with other devices, such as via a wired connection, a wireless connection, or a combination of wired and wireless connections. Communication interface 770 may permit device 700 to receive information from another device and/or provide information to another device. For example, communication interface 770 may include an Ethernet interface, an optical interface, a coaxial interface, an infrared interface, a radio frequency (RF) interface, a universal serial bus (USB) interface, a Wi-Fi interface, a cellular network interface, and/or the like.

A device 700 may perform one or more processes described elsewhere herein. A device 700 may perform these processes based on processor 720 executing software instructions stored by a non-transitory computer-readable medium, such as memory 730 and/or storage component 740. As used herein, the term "computer-readable medium" may refer to a non-transitory memory device. A memory device may include memory space within a single physical storage device or memory space spread across multiple physical storage devices.

Software instructions may be read into memory 730 and/or storage component 740 from another computer-readable medium or from another device via communication interface 770. When executed, software instructions stored in memory 730 and/or storage component 740 may cause processor 720 to perform one or more processes described elsewhere herein. Additionally, or alternatively, hardware circuitry may be used in place of or in combination with software instructions to perform one or more processes described elsewhere herein. Thus, implementations described herein are not limited to any specific combination of hardware circuitry and software.

The quantity and arrangement of components shown in FIG. 7 are provided as an example. In practice, a device 700 may include additional components, fewer components, different components, or differently arranged components than those shown in FIG. 7. Additionally, or alternatively, a set of components (e.g., one or more components) of a device 700 may perform one or more functions described as being performed by another set of components of a device 700.

As indicated above, FIG. 7 is provided as an example. Other examples may differ from what is described with regard to FIG. 7.

Persons of ordinary skill in the art will appreciate that the aspects encompassed by the present disclosure are not limited to the particular exemplary aspects described herein. In that regard, although illustrative aspects have been shown and described, a wide range of modification, change, and substitution is contemplated in the foregoing disclosure. It is understood that such variations may be made to the aspects without departing from the scope of the present disclosure. Accordingly, it is appropriate that the appended claims be construed broadly and in a manner consistent with the present disclosure.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" or "device" is intended to be broadly construed as hardware, firmware, or a combination of hardware and software. As used herein, a processor is implemented in hardware, firmware, or a combination of hardware and software.

As used herein, satisfying a threshold may, depending on the context, refer to a value being greater than the threshold, greater than or equal to the threshold, less than the threshold, less than or equal to the threshold, equal to the threshold, or not equal to the threshold, among other examples, or combinations thereof.

It will be apparent that systems or methods described herein may be implemented in different forms of hardware, firmware, or a combination of hardware and software. The actual specialized control hardware or software code used to implement these systems or methods is not limiting of the aspects. Thus, the operation and behavior of the systems or methods were described herein without reference to specific software code—it being understood that software and hardware can be designed to implement the systems or methods based, at least in part, on the description herein.

Even though particular combinations of features are recited in the claims or disclosed in the specification, these combinations are not intended to limit the disclosure of various aspects. In fact, many of these features may be combined in ways not specifically recited in the claims or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   receiving, by a user device, known authentic feature information that indicates a known authentic feature included in a known authentic communication, wherein the known authentic communication is associated with an authentic entity with which the user device is to communicate;
   determining, by the user device, current feature information that indicates a current feature included in a current communication, wherein the current communication is associated with a current entity with which the user device is communicating;
   comparing, by the user device, the known authentic feature information with the current feature information;
   selectively matching, by the user device based at least in part on a result of comparing the known authentic feature information with the current feature information, (i) current communication information utilized to communicate the current communication with (ii) known authentic communication information utilized to communicate the known authentic communication; and
   determining, by the user device based at least in part on a result of selectively matching the current communication information with the known authentic communication information, that the current entity is the known authentic entity or that the current entity is not the known authentic entity.

2. The method of claim 1, wherein comparing the known authentic feature information with the current feature information includes comparing an appearance of the current feature in the current communication with an appearance of the known authentic feature in the known authentic communication.

3. The method of claim 1, wherein selectively matching the current communication information with the known authentic communication information includes selectively matching the current communication information with the known authentic communication information when the result of comparing the known authentic feature information with the current feature information indicates that the observed feature is substantially the same as the known authentic feature.

4. The method of claim 1, wherein determining that the current entity is the known authentic entity includes determining that the current entity is the known authentic entity when the result of selectively matching the current communication information with the known authentic communication information indicates that the current communication information is substantially the same as the known authentic communication information.

5. The method of claim 1, wherein determining that the current entity is not the known authentic entity includes determining that the current entity is not the known authentic entity when the result of selectively matching the current communication information with the known authentic communication information indicates that the current communication information is not substantially the same as the known authentic communication information.

6. The method of claim 1, wherein
   the current feature includes a graphic or text and the known authentic feature includes a graphic or text,
   the current communication includes a webpage or an email associated with a current entity in communication with the user device and the known authentic communication includes a webpage or an email associated with a known authentic entity with which the user device intends to communicate, and the current communication information includes a uniform resource locator (URL) or a domain name associated with the current entity and the known authentic communication information includes a URL or a domain name associated with the known authentic entity.

7. The method of claim 1, wherein determining the current feature information includes determining the current feature information based at least in part on utilizing an extension application.

8. A user device, comprising:
a memory; and
a processor communicatively coupled to the memory, the memory and the processor being configured to:
receive known authentic feature information that indicates a known authentic feature included in a known authentic communication, wherein the known authentic communication is associated with an authentic entity with which the user device intends to communicate;
determine current feature information that indicates a current feature included in a current communication, wherein the current communication is associated with a current entity with which the user device is communicating;
compare the known authentic feature information with the current feature information;
selectively match, based at least in part on a result of comparing the known authentic feature information with the current feature information, (i) current communication information utilized to communicate the current communication with (ii) known authentic communication information utilized to communicate the known authentic communication; and
determine, based at least in part on a result of selectively matching the current communication information with the known authentic communication information, that the current entity is the known authentic entity or that the current entity is not the known authentic entity.

9. The user device of claim 8, wherein, to compare the known authentic feature information with the current feature information, the memory and the processor are configured to compare an appearance of the current feature in the current communication with an appearance of the known authentic feature in the known authentic communication.

10. The user device of claim 8, wherein, to selectively match the current communication information with the known authentic communication information, the memory and the processor are configured to match the current communication information with the known authentic communication information when the result of comparing the known authentic feature information with the current feature information indicates that the observed feature is substantially the same as the known authentic feature.

11. The user device of claim 8, wherein, to determine that the current entity is the known authentic entity, the memory and the processor are configured to determine that the current entity is the known authentic entity when the result of selectively matching the current communication information with the known authentic communication information indicates that the current communication information is substantially the same as the known authentic communication information.

12. The user device of claim 8, wherein, to determine that the current entity is not the known authentic entity, the memory and the processor are configured to determine that the current entity is not the known authentic entity when the result of selectively matching the current communication information with the known authentic communication information indicates that the current communication information is not substantially the same as the known authentic communication information.

13. The user device of claim 8, wherein
the current feature includes a graphic or text and the known authentic feature includes a graphic or text,
the current communication includes a webpage or an email associated with a current entity in communication with the user device and the known authentic communication includes a webpage or an email associated with a known authentic entity with which the user device intends to communicate, and
the current communication information includes a uniform resource locator (URL) or a domain name associated with the current entity and the known authentic communication information includes a URL or a domain name associated with the known authentic entity.

14. The user device of claim 8, wherein, to determine the current feature information, the memory and the processor are configured to determine the current feature information based at least in part on utilizing an extension application.

15. A non-transitory computer-readable medium configured to store instructions, which when executed by a processor associated with a user device, configure the processor to:
receive known authentic feature information that indicates a known authentic feature included in a known authentic communication, wherein the known authentic communication is associated with an authentic entity with which the user device intends to communicate;
determine current feature information that indicates a current feature included in a current communication, wherein the current communication is associated with a current entity with which the user device is communicating;
compare the known authentic feature information with the current feature information;
selectively match, based at least in part on a result of comparing the known authentic feature information with the current feature information, (i) current communication information utilized to communicate the current communication with (ii) known authentic communication information utilized to communicate the known authentic communication; and
determine, based at least in part on a result of selectively matching the current communication information with the known authentic communication information, that the current entity is the known authentic entity or that the current entity is not the known authentic entity.

16. The non-transitory computer-readable medium of claim 15, wherein, to compare the known authentic feature information with the current feature information, the processor is configured to compare an appearance of the current feature in the current communication with an appearance of the known authentic feature in the known authentic communication.

17. The non-transitory computer-readable medium of claim 15, wherein, to selectively match the current communication information with the known authentic communication information, the processor is configured to match the current communication information with the known authentic communication information when the result of comparing the known authentic feature information with the current feature information indicates that the observed feature is substantially the same as the known authentic feature.

18. The non-transitory computer-readable medium of claim 15, wherein, to determine that the current entity is the known authentic entity, the processor is configured to determine that the current entity is the known authentic entity when the result of selectively matching the current communication information with the known authentic communication information indicates that the current communication information is substantially the same as the known authentic communication information.

19. The non-transitory computer-readable medium of claim 15, wherein, to determine that the current entity is not the known authentic entity, the processor is configured to determine that the current entity is not the known authentic entity when the result of selectively matching the current communication information with the known authentic communication information indicates that the current communication information is not substantially the same as the known authentic communication information.

20. The non-transitory computer-readable medium of claim 15, wherein
- the current feature includes a graphic or text and the known authentic feature includes a graphic or text,
- the current communication includes a webpage or an email associated with a current entity in communication with the user device and the known authentic communication includes a webpage or an email associated with a known authentic entity with which the user device intends to communicate, and
- the current communication information includes a uniform resource locator (URL) or a domain name associated with the current entity and the known authentic communication information includes a URL or a domain name associated with the known authentic entity.

\* \* \* \* \*